United States Patent [19]
Wilson

[11] 4,111,312
[45] Sep. 5, 1978

[54] TRANSPORT VEHICLES

[76] Inventor: Leslie Henry Wilson, 28 Gould St., Frankston, Australia

[21] Appl. No.: 762,303

[22] Filed: Jan. 25, 1977

[30] Foreign Application Priority Data

Jan. 27, 1976 [AU] Australia .............................. 4626/76

[51] Int. Cl.² ............................................. B65G 57/32
[52] U.S. Cl. ..................................... 214/6 B; 214/6 S
[58] Field of Search ......................... 214/6 B, 6 S, 6 P

[56] References Cited

U.S. PATENT DOCUMENTS

| | | | |
|---|---|---|---|
| 3,501,025 | 3/1970 | Joy et al. | 214/6 B |
| 3,877,584 | 4/1975 | Holcombe | 214/6 B |
| 3,897,877 | 8/1975 | Vandermeer et al. | 214/6 S |
| 3,917,082 | 11/1975 | Howard et al. | 214/6 S |
| 4,005,784 | 2/1977 | Wilson | 214/6 B |

*Primary Examiner*—Robert G. Sheridan
*Assistant Examiner*—Ross Weaver
*Attorney, Agent, or Firm*—Cushman, Darby & Cushman

[57] ABSTRACT

A wheeled transport vehicle of the kind disclosed in my prior application Ser. No. 553,163 now U.S. Pat. No. 4,005,784, is provided with at least one laterally adjustable barrier member which forms a side or end of an interior space within which successive layers of bales or other articles are formed on or over the floor.

A vehicle of the aforesaid kind has a body which is open at the back and comprises spaced side walls and a front wall and a vertically movable floor is arranged therein and is progressively lowered as successive layers of articles are formed within the upper part of the body.

The said barrier member may have the form of a rail or bar or it may be an auxiliary wall which preferably is shallow in depth so as to be disposed wholly above the level of the floor when the latter is in its uppermost operative position whereby it is movable inwardly above the latter.

The said barrier member or one or more of them, is preferably movable inwardly by power actuated means, thereby to push the bales or other articles closer together.

More particularly each of the barrier members is disposed inwardly of, and adjacent and parallel to, a corresponding side or end wall of the body which may also be open at the bottom so that the floor may be lowered onto the ground and then detached from its raising and lowering means.

The floor may also support a longitudinally slidable pallet or false floor so that the latter may be discharged together with a stack of bales formed thereon.

5 Claims, 3 Drawing Figures

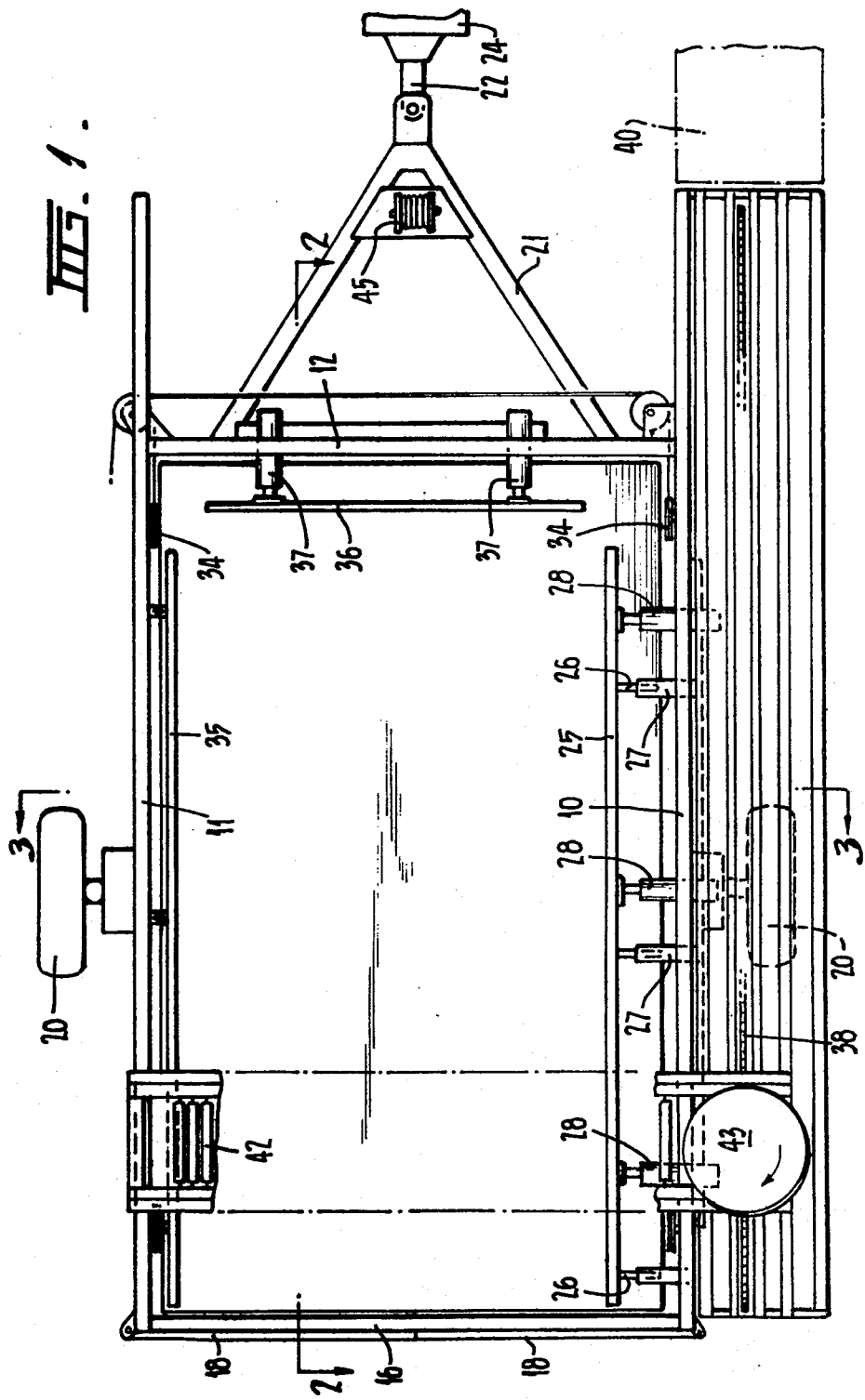

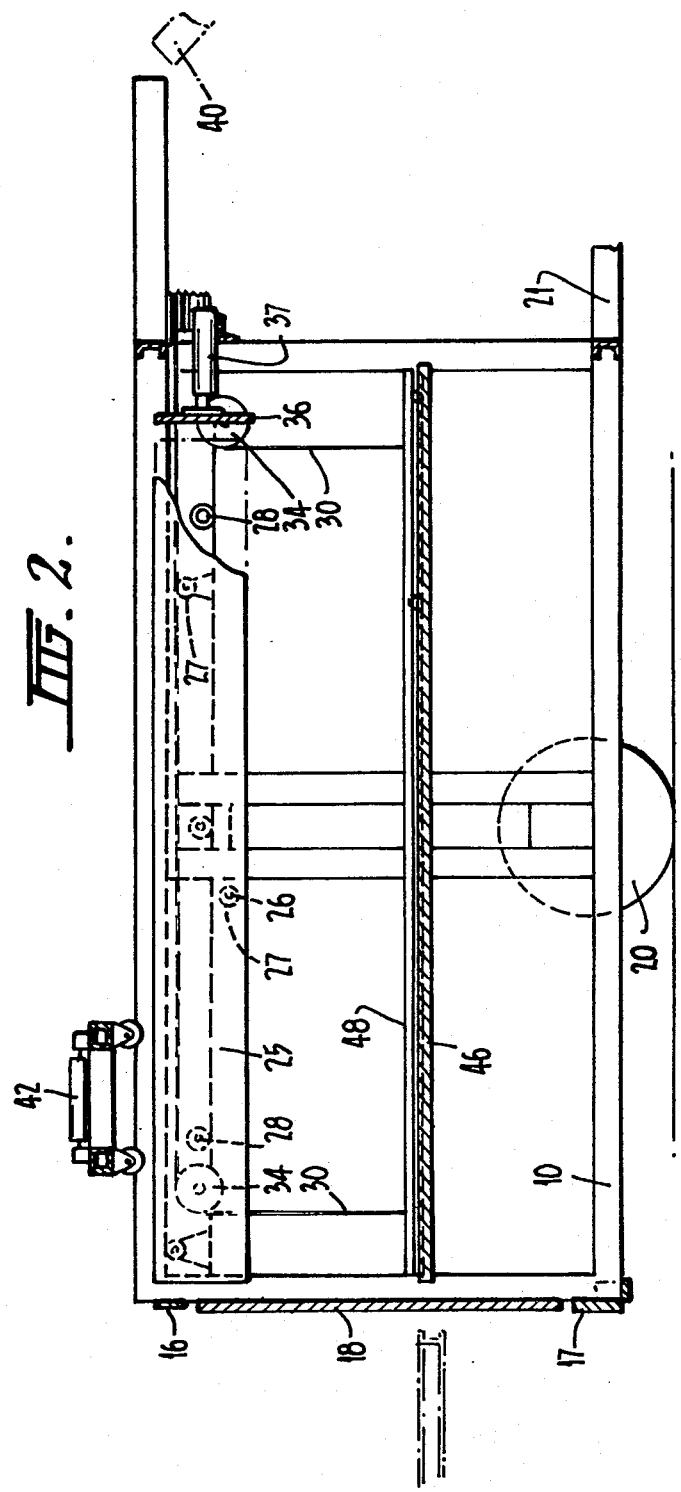

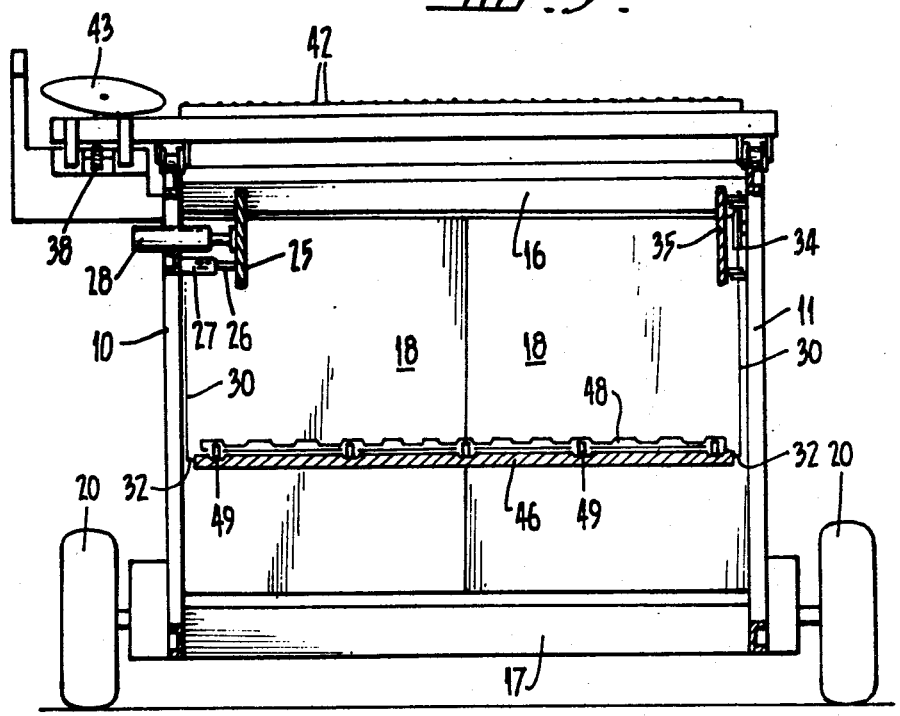

TRANSPORT VEHICLES

This invention relates to wheeled transport vehicles and more particularly to vehicles of the kind having a vertically movable floor which is progressively lowered during the loading operation, such vehicles being primarily intended for the transport of articles of generally rectangular form, including hay bales, cases, cartons and other like containers for goods of various kinds.

The object of this invention is to provide improvements in transport vehicles of the aforesaid kind thereby to facilitate the formation therein of stacks of bales or other articles.

Accordingly, the invention provides in a transport vehicle of the kind having a body supported on transport wheels, a vertically movable floor, and raising and lowering means therefor, said body being open at the back and comprising spaced side walls and a front wall, and including a horizontally disposed and laterally adjustable barrier member arranged inwardly of, and adjacent and parallel to, one of the said walls, thereby to form the respective side or end of an interior space within which bales or other articles may be stacked on and over the floor.

The laterally adjustable barrier member may have the form of a rail or bar but preferably it has the form of an auxiliary wall of any suitable height. Preferably however this auxiliary wall is arranged within the upper part of the body so as to be disposed wholly above the level of the floor when the latter is located in its uppermost position so as to be movable inwardly above the latter. This auxiliary wall therefore forms the respective side or end wall of the laterally enclosed space, or loading zone, within which each successive layer of bales or other articles is formed as hereinafter further explained.

Preferably at least two such laterally adjustable auxiliary walls are provided, one being a side wall and the other an end wall.

The said auxiliary wall, or one at least of them, is preferably movable inwardly by hydraulic or other suitable power actuated means which enable the bales or other articles in each layer to be pushed closer together thus substantially closing the spaces which are generally left between adjacent articles when they are initially deposited on the floor.

The vertically movable floor may support a longitudinally movable pallet on which the stack is formed. This pallet is preferably supported on rollers or the like to facilitate its transfer, together with the load thereon, to a fixed support or to another vehicle such as a flattop, road or rail truck.

The transfer operation may be effected by any suitable means such as by a towing cable detachably connected to the pallet.

Before transfer from the vehicle, the formed stack may be secured to the pallet or to the floor by tie ropes or otherwise.

In order however that the invention may be more fully understood, one particular form thereof is more fully described below with reference to the accompanying drawings in which:-

FIG. 1 is a view in plan of a transport vehicle,

FIG. 2 is a view in sectional elevation taken on the line 2—2 of FIG. 1, and

FIG. 3 is a view in sectional end elevation taken on the line 3—3 of FIG. 1.

The illustrated transport vehicle has a rigid body which is open at the back and which comprises vertical side walls 10 and 11 and a front wall 12.

The upper and lower portions of the rear ends of the side walls are normally rigidly secured together by upper and lower transverse tie members 16 and 17 respectively, which are pivoted at one end and detachably secured at the other, or which are otherwise movable or removable for the purpose hereinafter explained.

The rear end of the vehicle between the lower and upper members 16 and 17 is normally closed by two hinged doors 18, each of which is hingedly connected to the rear end of the respective side wall.

Suitable provision is also made to enable the free inner edges of the two doors, when closed, to be secured firmly together in a manner which braces the open rear end of the rigid main frame of the body.

In the illustrated construction, the body is supported approximately midway between its ends by an opposed pair of transport wheels 20, mounted on stub axles, though it will be understod that, if desired, any required number of spaced pairs of such wheels may be provided and that twin wheels may be used in circumstances where it is necessary to do so. The lower part of the front of the body is provided centrally with a forwardly extending rigid "A" frame 21 fitted with means for the pivotal attachment thereto of the tow bar 22 of a tractor 24, the rear end portion only of which is shown in FIG. 1.

A vertically movable horizontal floor 46 arranged within the body is suspended from the top of the latter by four flexible cables 30, one of which is arranged near each corner of the floor. The lower end of each of these cables may be detachably connected to the floor for which purpose each cable end may be provided with a ring for engagement with a corresponding pin 32 which projects laterally from the floor.

Each cable 30 extends vertically upwards from the floor to and partly around a corresponding flanged pulley 34, rotatively mounted on an upper part of the respective side wall 10 of the body and the cables then extend horizontally forwards therefrom and are connected to any suitable power actuated means by which they may be raised and lowered in unison, e.g. by hydraulic ram, not shown.

The bottom of the vehicle body is preferably open and entirely unobstructed so that the floor 46 may be lowered, together with a stack of bales thereon, until it rests on the ground at which time the several cables 30 may be detached therefrom. The doors 18 are then fully opened and the transverse members 16 and 17 are removed or swung clear, after which the vehicle may be moved forwardly to leave the floor and stack on the ground behind it.

The right hand side wall 10 of the body is provided at the top with a horizontal longitudinally extending chain conveyor, generally designated 38, and as shown best in FIG. 3 this conveyor preferably overhangs the outer side of the respective side wall so that it does not obstruct the interior of the vehicle.

This longitudinal conveyor projects forwardly beyond the front wall 12 of the vehicle body so that its projecting forward end may be disposed close to the upper end of the elevator conveyor 40 forming part of a conventional bale pick-up and elevator of any suitable known construction, which is attached by outriggers to the corresponding side of the tractor 24.

The vehicle body is also provided with a transverse roller conveyor, generally designated 42, which is arranged at a higher level than the longitudinal conveyor 40 so as to be movable above it. This transverse conveyor may be moved backwards and forwards either manually or otherwise and means may be provided for retaining it in any required position for the formation of each transverse row of bales or the like.

Suitable ramp or other means 43 are provided for transferring the successive bales from the longitudinal conveyor 40 to the transverse conveyor 42.

Thus the transport may be towed around a field, whereby bales lying thereon may be successively picked up, elevated and delivered onto the forward end of the longitudinal conveyor 40 from which they are directed onto the transverse conveyor 42. The bales are later manually removed from the conveyor 42 at the required position to form a transverse row thereof on the floor or on a previously formed layer of bales.

At the outset of the operation, the floor 46 is raised to its full extent at which time the distance between it and the underside of the frame of the transverse conveyor 42 may be only a little more than the depth of one layer of bales.

Thus, an operator standing on the floor and having control of the hydraulic operating apparatus by means of control valves arranged in any convenient position, may form successive transverse rows of bales on the floor until a complete layer or tier is formed thereon.

When the lowermost layer is completed, the floor is lowered through a distance approximately equal to the depth of the layer after which a second layer is similarly formed thereon and these operations are repeated until the required number of layers has been formed after which the vehicle is towed to a position at which the load is to be discharged.

The vehicle as so far described is disclosed in my prior application No. 553163 but for the purpose of the present invention, a laterally adjustable barrier member in the form of an auxiliary side wall 25 is arranged inwardly of, and adjacent and parallel to, the side wall 10. The height of this auxiliary wall is approximately equal to the depth of each layer of bales, and it is disposed above the level of the floor when the latter is in its uppermost position so as to be movable inwardly above it. This auxiliary wall, which thus forms the respective side of the enclosure within which each successive layer of bales is formed, is adjustable laterally in order to vary the effective width of the said enclosure and for this purpose it may be provided with a plurality of outwardly projecting rods 26 which are slidably supported in fixed guide members 27. The auxiliary wall is displaceable manually or otherwise by any suitable means and provision is made for securing it in any required adjustment position. More particularly the auxiliary wall is preferably moved inwardly by suitable power actuated means such as by hydraulic rams 28.

Preferably, and as shown, a second auxiliary side wall 35 is similarly arranged adjacent to the opposite side wall 11 of the body and is normally fixed in position but is preferably adjustable inwardly and outwardly either manually or otherwise.

As hay bales are formed in different sizes it is advantageous to provide means for varying the effective width of the enclosure within which the successive layers are to be formed as otherwise it may be necessary to leave considerable spaces, approaching one bale length in size, at one side or the other of the enclosure and in such a case it would be difficult to form a regular and stable stack. However by means of the adjustable side walls 25 and 35, the effective width of the layer forming enclosure, may be ajusted to suit the dimensions of the particular bales or other articles being handled.

The auxiliary side walls also ensure that the sides of the stack are disposed clear of the respective side walls 10 and 11 of the frame and of the side edges of the floor 46 while also they may serve as shields for any apparatus located in the spaces between the side walls of the body and the auxiliary walls. If desired the two auxiliary side walls may be adjustable in unison.

Thus the auxiliary side wall or walls is or are initially adjusted to suit the dimensions of the bales or other articles, while leaving sufficient clearance space for easy placement of the latter. However, after the layer is initially formed, the power operated auxiliary wall 25 may be forced inwardly to move the bales closer together.

The forward end of the bale forming enclosure is preferably formed by an auxiliary front wall 36 which is approximately equal in depth to the auxiliary side walls 25 and 35. This auxiliary front wall is guided for movements in the longitudinal direction of the vehicle and is preferably displaceable by suitable power actuated means, such as the illustrated hydraulic rams 37, so that it is adapted to serve as a pressure plate by means of which the bales, cases, cartons or the like in one layer thereof may be pushed more or less into contact and during this operation, the rear upper transverse member 17 serves as the rear wall of the enclosure.

In this connection it should be explained that it is both difficult and time-absorbing to arrange the bales or other articles in close contact during the formation of a layer thereof and, if this is not done at some stage, the stack formed would have irregular side and/or end walls, and may be unstable in consequence, apart from which it would contain much waste space.

However by pushing the bales or other articles into contact by means of the power operated side and end auxiliary walls 25 and 36, a regular, straight-sided and stable stack is formed. These power operated auxiliary walls are retracted before the floor is lowered through a distance equal to the depth of the layer of bales, to enable a further layer to be formed on the top thereof.

Thus a regular stack with substantially vertical walls and little waste space is formed and it may be retained in this condition for transfer to another vehicle, by lashing it to the floor or to a pallet or false floor 48 which is supported on the floor 46. This pallet 48 is provided on its underside with a plurality of rollers 49 by which it is supported on the floor 46 and which enable it to be moved lengthwise of the body of the vehicle.

Thus by means of the pallet 48, the stack may readily be transferred to the deck of a conventional flat top motor truck 50 (indicated in broken lines in FIG. 2) and for this purpose the rear end of the pallet may be connected to a cable (not shown) which extends rearwardly therefrom to and around pulleys (not shown) on the truck and finally forwardly therefrom to one or more winch drums 45 on the transport vehicle. However any other suitable means may be used for the same purpose.

As the pallet is at all times supported at suitably close intervals on the floor 46 or on the deck of the truck 50, or other support by the rollers 49, it may be of lightweight construction.

Thus in order to effect the transfer of a stack which has been formed on the pallet 48 the rear doors 18 are opened and the upper transverse member 17 is swung to one side.

The truck 50 is then backed up to the open back of the transport and the floor 46 of the latter is raised or lowered as required so that it is disposed in alignment with the tray of the truck.

When it is thus necessary to raise the floor 46, the top of the stack of bales or the like may then project above the top of the transport vehicle and for this purpose the top of the latter is preferably fully open. The transfer is then effected by a towing cable 44, as described, or in any other suitable manner. It will be apparent that the pallet and stack may be similarly transferred to a fixed storage bay such as a concrete slab arranged approximately at ground level.

In many cases it would be preferable to leave the pallet, as well as the bale stack, on the truck 84 to facilitate the transfer of the load from the truck at its destination. However if this is not desired, the pallet may be returned to the transport vehicle by attaching the aforesaid towing cable to its forward end. Consequently by suitably obstructing the open back of the transport, e.g. by re-closing the doors 18, the bales are then progressively pushed onto the truck or storage bay from the rear end of the pallet as the latter is being pulled forwardly onto the floor 46 of the transport.

A transport vehicle according to the invention, may also be used for many purposes other than picking up and stacking and transport of hay bales or the like, including for example, the picking, grading and packing, into cases or cartons, of fruit or the like. Thus for example, the upper part of a transport vehicle of the aforesaid kind may be provided with fruit picking, grading and packing facilities so that it may be driven along the lanes between rows of citrus or other fruit trees. The supporting floor 46 would initially be disposed in its uppermost position, so that operatives standing on the floor or on one or more booms mounted on the transport, may pick the fruit which is then graded and packed into the cases or cartons which are then distributed over the floor to form successive layers thereon.

I claim:

1. A transport vehicle of the kind having a body supported on transport wheels, a vertically movable floor, and raising and lowering means therefor, said body being open at the back and comprising spaced side walls and a front wall, and including a horizontally disposed barrier member arranged inwardly of and adjacent and parallel to, each of the side walls, thereby to define the respective sides of an interior space within which bales or other articles may be stacked on and over the floor to form a layer upon said floor, said barrier members being arranged within the upper part of the body so as to be movable inwardly and outwardly above the floor when the latter is in its uppermost operative position, and power actuated means operable to move at least one of said barrier members inwardly, thereby to push said bales or other articles closer together after formation of each layer.

2. A transport vehicle of the kind having a body supported on transport wheels, a vertically movable floor, and raising and lowering means therefor, said body being open at the back and comprising spaced side walls and a front wall, and including a horizontally disposed barrier member arranged inwardly of, and adjacent and parallel to, each of the said walls, thereby to form the corresponding sides and end of an interior space within which bales or other articles may be stacked on and over the floor to form a layer upon said floor, and power actuated means operable to move at least one of the side barrier members inwardly, thereby to push said bales or other articles closer together after formation of each layer.

3. A transport vehicle of the kind having a body supported on transport wheels, a vertically movable floor, and raising and lowering means therefor, said body being open at the back and comprising spaced side walls and a front wall, the body being also open at the bottom so that the floor may be lowered onto the ground and then detached from said raising and lowering means, and including a horizontally disposed and laterally adjustable barrier member arranged inwardly of, and adjacent and parallel to, one of the side walls and wholly above the level of the floor when the latter is in its uppermost operative position, thereby to form the respective side of an interior space within which bales or other articles may be stacked on and over the floor to form a layer upon said floor, and power actuated means operable to move said barrier member inwardly, thereby to move the bales or other articles closer together after formation of each layer.

4. A transport vehicle of the kind having a body supported on transport wheels, a vertically movable floor, and raising and lowering means therefor, said body being open at the back and comprising spaced side walls and a front wall, a horizontally disposed and laterally adjustable barrier member arranged inwardly of, and adjacent and parallel to, one of the said walls, thereby to define the respective side or end of an interior space within which bales or other articles may be stacked on and over the floor to form a layer upon said floor, said barrier member being arranged within the upper part of the body so as to be disposed wholly above the level of the floor when the latter is in its uppermost operative position, and power actuated means operable to move said barrier member inwardly thereby to push the bales or other articles closer together after formation of each layer.

5. A transport vehicle according to claim 4 including a pallet slidably supported on the floor whereby it is transferable together with a stack of bales or other articles supported thereon.

* * * * *